UNITED STATES PATENT OFFICE.

WILLIAM FREDERIC SINGER, OF PUEBLO, COLORADO, ASSIGNOR OF ONE-FOURTH TO HIMSELF, ONE-FOURTH TO AXEL V. FAGERSTROM, ONE-FOURTH TO FRED CLASBY, AND ONE-FOURTH TO JOHN E. FAIRBANKS, ALL OF PUEBLO, COLORADO.

COMPOSITION FOR MENDING FISSURES IN CASTINGS.

1,291,207. Specification of Letters Patent. Patented Jan. 14, 1919.

No Drawing. Application filed June 8, 1918. Serial No. 238,915.

*To all whom it may concern:*

Be it known that I, WILLIAM FREDERIC SINGER, a citizen of the United States, residing at Pueblo, in the county of Pueblo and State of Colorado, have invented a new and Improved Composition for Mending Fissures in Castings, of which the following is a full, clear, and exact description.

An object of my invention is to produce a composition for filling cracks or fissures in gas engine cylinders, water jackets, tubes, etc., which are not subject to a pressure above 100 pounds per square inch.

Another object of the invention is to provide a composition with which the closing up of such fissures or cracks can be easily accomplished.

The composition consists primarily of carbon and sulfur, to which other ingredients may be added if so desired but this is not necessary. For example, asbestos or other fibrous material may be added, also coloring material to change the color of the composition.

The carbon is preferably in the shape of graphite, which is added to the sulfur after the same has been melted. The quantity of sulfur and carbon may vary to a great extent; 90% of sulfur may be used with 10% of graphite, or 50% of sulfur with 50% of graphite. For filling fissures in cast iron, the best results are obtained with 60% by weight of sulfur and 40% by weight of graphite.

The composition is prepared in the following manner: The sulfur is first melted and then graphite is added to the melted sulfur while the sulfur is stirred to produce a homogeneous mixture. When the desired homogeneity is obtained the composition is molded into suitable shapes.

When applying the composition for mending castings, it is preferably heated at the place where the composition is to be applied by means of a blow torch, the heat being sufficient to melt the mending material, which will flow easily and therefore penetrate the finest portions of the crack, in consequence insuring the filling of the crack.

I claim:

1. A composition for mending fissures in castings, comprising sulfur and graphite in proportions substantially of 3 to 2.

2. A composition for mending fissures in castings, in the shape of a solid comprising sulfur, 60%, and graphite, 40%, the graphite being added to the sulfur while the sulfur is in a molten state.

WILLIAM FREDERIC SINGER.